United States Patent [19]

Wecker

[11] 4,026,102

[45] May 31, 1977

[54] ELECTRONIC CLOCK

[75] Inventor: Leon S. Wecker, Hallandale, Fla.

[73] Assignee: Topp Electronics, Inc., Miami, Fla.

[22] Filed: Mar. 18, 1975

[21] Appl. No.: 559,506

Related U.S. Application Data

[63] Continuation-in-part of Ser. No. 436,681, Jan. 25, 1974, Pat. No. 3,888,075.

[52] U.S. Cl. ................................ 58/50 R; 307/38; 315/169 R; 340/324 M

[51] Int. Cl.² .................... G04B 19/30; H02J 1/00; H05B 37/00; G08B 23/00

[58] Field of Search ......... 58/23 BA, 50 R; 307/11, 307/17, 32, 38, 41, 304; 315/169 R, 169 TV; 340/324 R, 324 M, 331–332, 336

[56] References Cited

UNITED STATES PATENTS

| | | | |
|---|---|---|---|
| 3,388,292 | 6/1968 | Burns | 340/324 M |
| 3,443,151 | 5/1969 | Myers et al. | 307/304 X |
| 3,630,015 | 12/1971 | Lehovel | 58/50 R |
| 3,655,442 | 5/1972 | Brooks | 340/248 R |
| 3,666,960 | 5/1972 | Dawson | 307/311 |
| 3,672,155 | 6/1972 | Bergey et al. | 58/50 R |
| 3,755,679 | 8/1973 | Otsuka | 250/217 SS |
| 3,755,697 | 8/1973 | Miller | 307/311 |
| 3,759,031 | 9/1973 | McCullough et al. | 58/50 R |
| 3,813,533 | 5/1974 | Cone et al. | 58/50 R |
| 3,823,551 | 7/1974 | Riehl | 58/50 R |
| 3,878,406 | 4/1975 | Beneking | 307/304 |

OTHER PUBLICATIONS

Schlig, Mos Current Driver for Light Emitting Diodes, IBM Technical Disclosure Bulletin, vol. 15, No. 2, 1972, pp. 498, 499.

*Primary Examiner*—E. S. Jackmon
*Attorney, Agent, or Firm*—Clarence A. O'Brien; Harvey B. Jacobson

[57] ABSTRACT

A numerical display unit formed by light emitting diode segments, is directly driven by the field effect transistors associated with an integrated timer circuit chip. A DC driving current is supplied to common electrodes of the transistors while the light emitting diodes are interconnected in a corresponding common electrode arrangement so that the same driving current is conducted through each of the transistors and associated light emitting diodes.

14 Claims, 7 Drawing Figures

Fig. 1
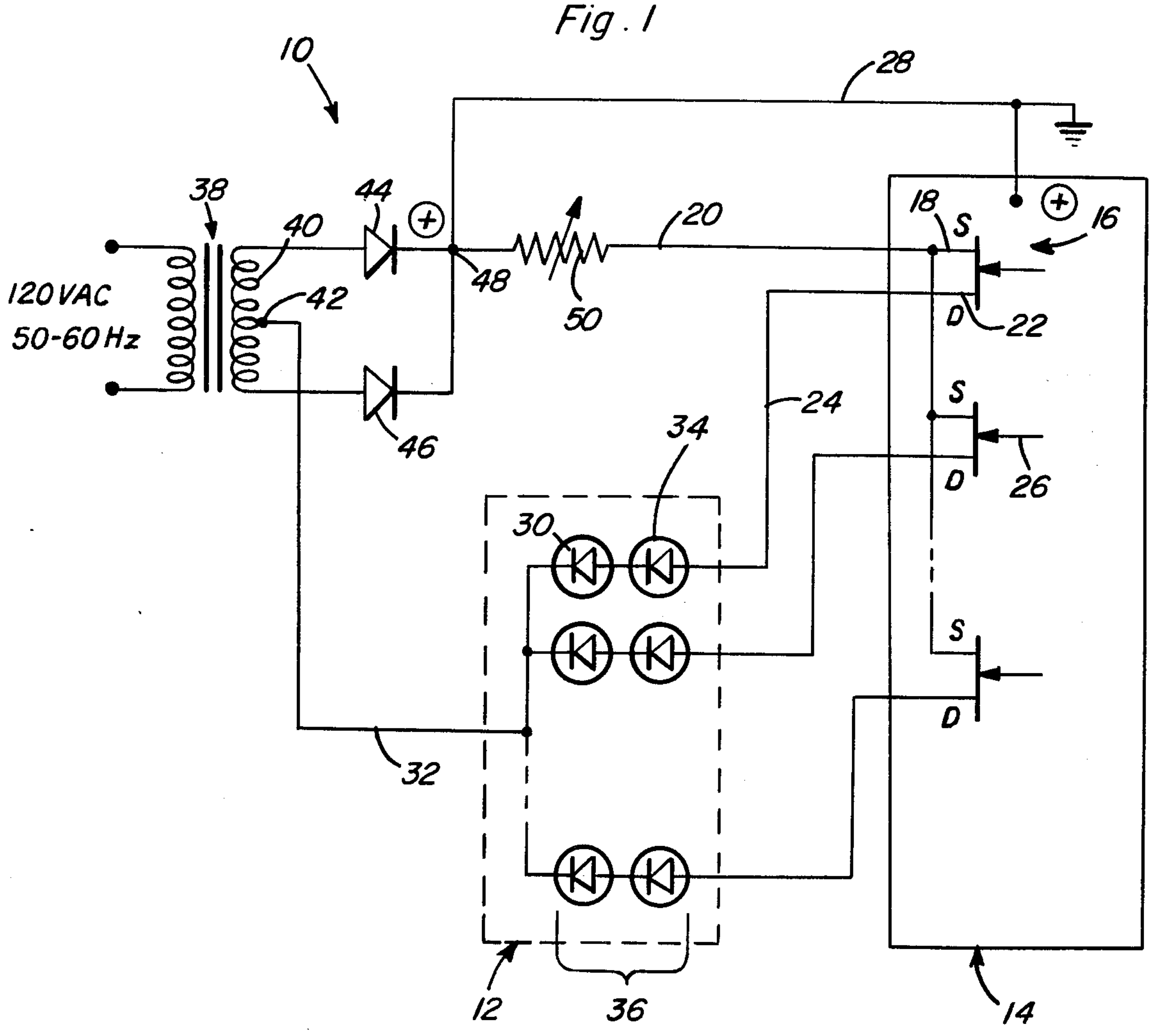
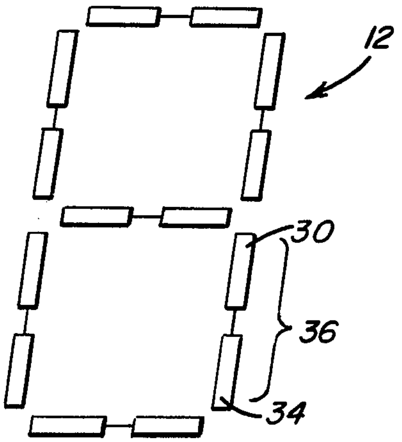
Fig. 2

ELECTRONIC CLOCK

This invention relates generally to the drive of numeric display devices associated with timer circuits and the present application is a continuation-in-part of my prior copending application, U.S. Ser. No. 436,681, filed Jan. 25, 1974, now U.S. Pat. No. 3,888,075.

As pointed out in my prior copending application, standard light emitting diode (LED) display units are generally driven by three well known methods consisting of a strobe or multiplex drive, a power transistor drive, and a direct drive method. In the strobe or multiplex drive method, a high speed switching waveform current is utilized to control the on-time and off-time periods of each LED segment. However, a broad spectrum of electrical noise is also produced requiring the use of heavy shielding to avoid interference with radio or TV equipment. The power transistor drive method involves the use of a driver transistor for each LED segment externally of the timer circuit so that the relatively low output of the timer circuit may be maintained below its rated value to assure thermal stability and long life. The cost of such a method is high because of the number of driver transistors and related biasing resistors. The direct drive method involves direct connection of the LED segments to the outputs of the timer circuit. However, only relatively small display units could heretofore be directly driven by the low output current of an integrated circuit chip. Except for the foregoing problem, the direct drive method is very desirable because of its low cost and the small number and size of the drive components.

It is therefore an important object of the present invention to provide an improved direct drive arrangement for a relatively large LED segment display unit driven by an integrated timer circuit for sufficient light output while maintaining proper and safe energy dissipation in the timer circuit package or chip.

In accordance with the present invention, the output field effect transistors (FET) associated with commercially available integrated timer circuit chips are supplied with a DC driving current at common connected source or drain electrodes. This same driving current is conducted to the light emitting diodes interconnected in either a common anode or cathode arrangement. The polarity of the DC driving current and the light emitting diodes is selected in accordance with the type of FET outputs in the timer circuit for establishing a suitable energizing circuit for the LED segments in the display unit. Preferably, a periodically varying DC current is utilized for higher peak light output from the LED segments.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a circuit diagram corresponding to one embodiment of the present invention.

FIG. 2 illustrates a typical LED segment type display unit associated with the present invention.

Figure 3:
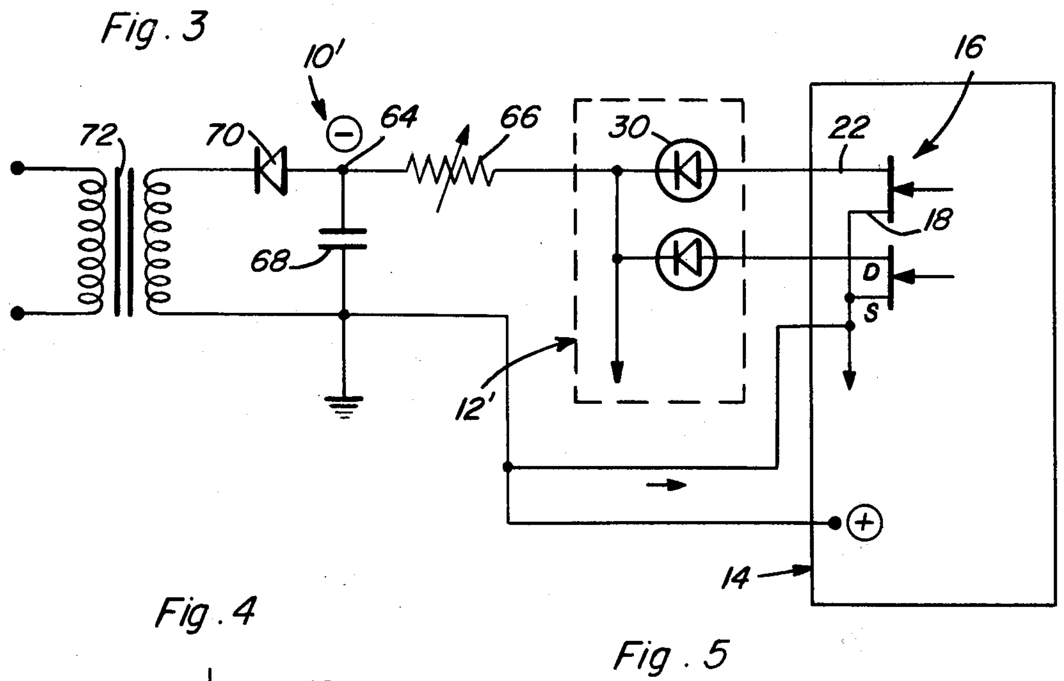
FIG. 3 is a circuit diagram corresponding to a second embodiment of the present invention.

Referring now to the drawings in detail, FIG. 1 illustrates a direct drive, power supply circuit 10 for a numeric display unit 12 driven by an integrated timer circuit chip 14 known as a large scale integrated (LSI) clock circuit. Presently, clock circuit chips on the market have output components in the form of field effect transistors 16 of the P- or N-channel type interconnected in a common source or common drain configuration. Thus, the source electrodes 18 of the FETs 16 as shown in FIG. 1 are interconnected in parallel to a driving current supply line 20 of the driver circuit. The drain electrodes 22 on the other hand, are respectively connected directly by output lines 32 to the display unit 12. The FET transistors are switched on and off through signals supplied to the control electrodes 26 during operation of the timer circuit 14. A suitable DC operating current is supplied to the timer circuit through conductor 28 for this purpose.

Most commercially available LED display units have been of the common anode type. However, the display unit 12 shown in FIG. 1 is of the common cathode type wherein the cathodes of LED diodes 30 are interconnected in parallel to common negative through conductor 32. Further, diodes 34 are connected in series with the diodes 30 to form a segment 36 of a standard seven-segment type of numeric display unit as shown in FIG. 2. It should, however, be appreciated that a single light emitting diode or any other number of such diodes may be utilized for each segment of the display unit. Different combinations of the LED segments are energized through the output lines 24 to form numeric images as is well known to those skilled in the art.

The power supply circuit 10 is shown in FIG. 1 is connected to a 120 VAC source of alternating current through a power transformer 38 having an output secondary winding 40 with a negative common center tap 42 to which the common cathodes of the LED diodes 30 are connected. The output terminals of winding 40 are connected by rectifying diodes 44 and 46 to a positive DC voltage terminal 48 thereby supplying DC operating current to the timer circuit 14 through conductor 28 as aforementioned and a full relatively lower wave rectified DC driving current to the common source electrodes of the FET transistors 16 through resistor 50. The magnitude of the driving current is adjusted through resistor 50 to obtain the desired light output intensity of the display unit 12.

Figure 7:
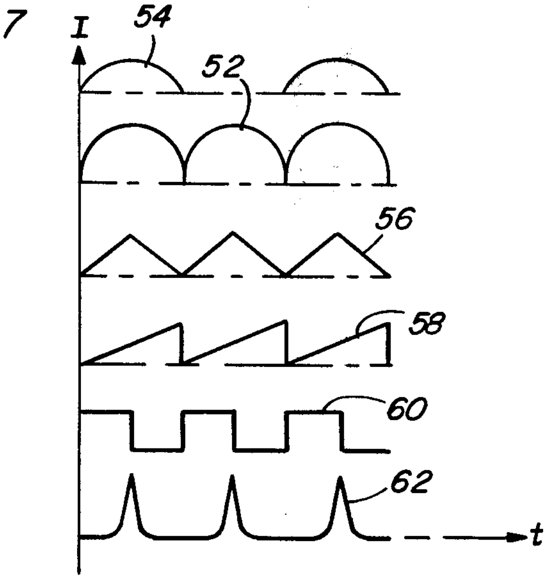
FIG. 7 is a graphical illustration of various alternative driving current characteristics.

The full wave rectified DC driving current is depicted in FIG. 7 by curve 52. Other periodically varying DC driving currents are shown in FIG. 7 including a half-wave rectified current 54, a ramp current 56, a saw tooth current 58, a pulse current 60 and a spike current 62. Any one or combination of the foregoing waveforms could be utilized for the DC driving current as well as a filtered, constant or pure DC current. In practice, a periodically varying driving current is found to be preferable in that it produces a higher peak output from the LED diodes.

In FIG. 1, a positive DC voltage is applied to the common source electrodes 18 of the P-channel FET transistors 16 for greater efficiency since the forward resistance of a P-channel FET transistor is lower with a positive supply than with a negative supply. However, for such an arrangement, the common cathode configuration is required for the LED segment display unit 12 in order to drive the same with a full wave, DC driving current. In FIG. 3, the power supply circuit 10' supplies a pure DC positive driving current to the common source electrodes 18 of the FET transistors 16 of the timer circuit. The common cathodes of LED diodes 30 in the display unit 12' are connected to the negative DC voltage terminal 64 through resistor 66. A filter capacitor 68 is connected between the negative terminal 64 and positive ground to which the timer circuit is connected. Diode 70 rectifies the negative current conducted between terminal 64 and the power transformer 72.

Figure 4:
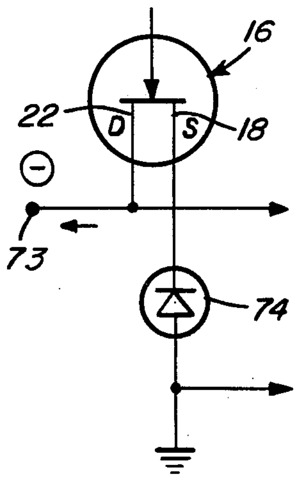
FIGS. 4, 5 and 6 are partial circuit diagrams showing other embodiments contemplated.

Since FET transistors are bilateral and may hence conduct with either polarity on the source or drain, driving current may thus be supplied to the FET transistors 16 from a negative terminal 73, the transistors being interconnected in a common drain configuration, as shown in FIG. 4. The transistors 16 being of the P-channel type have their output source electrodes 18 directly connected to the cathodes of LED diodes 74 in the display unit, the diodes 74 being interconnected in a common anode configuration. The modification of FIG. 4 permits the use of the commercially available, common anode type of LED display unit.

Figure 5:
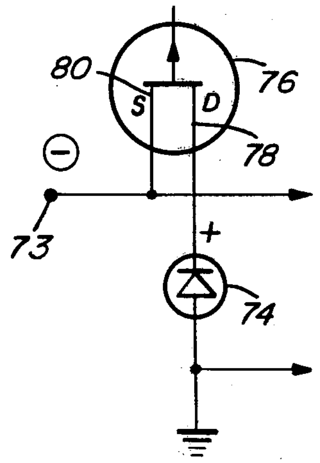
Figure 6:
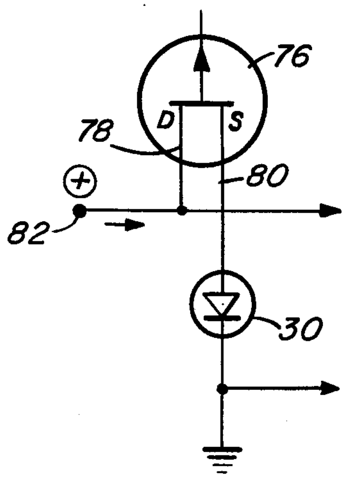

The common anode type of LED display unit driven by a DC driving current from negative voltage terminal 73 may also be utilized in association with N-channel types of FET transistors 76 as shown in FIG. 5, provided the cathodes of the diodes 74 are connected to the drain electrodes 78 of the transistors. The transistors are then interconnected with the negative voltage terminal 73 in a common source configuration. The N-channel type of FET transistor 76 may also be used to drive a common cathode type LED display wherein the anodes of the LED diodes 30 are connected to the source electrodes 80 as shown in FIG. 6. In the latter modification, the N-channel, FET transistors 76 have their drain electrodes 78 interconnected with a positive voltage terminal 82 from which the DC driving current is derived. The arrangements depicted in FIGS. 4 and 6, are satisfactory and represent acceptable modifications of the invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a timer circuit having a plurality of transistors interconnected in a common electrode configuration for drive from a common supply of voltage, a display device comprising a plurality of light emitting components having common electrodes interconnected in parallel, a plurality of series circuits respectively formed by at least one of the light emitting components connected in series with the controllable path of one of the transistors, said transistors having control electrodes operated by the timer circuit, means directly interconnecting the common supply of voltage and the common electrodes of the light emitting components for conducting the same driving current through each of the series circuits, and a rectifier circuit connected to the common supply having opposite polarity terminals, said interconnecting means being connected between one of the terminals and the common electrodes of the light emitting components.

2. The combination of claim 1 wherein the other of the terminals is connected to the timer circuit and the common electrodes of the transistors.

3. In combination with a timer circuit having a plurality of transistors interconnected in a common electrode configuration for drive from a common supply of voltage, a display device comprising a plurality of light emitting components having common electrodes interconnected in parallel, a plurality of series circuits respectively formed by at least one of the light emitting components connected in series with the controllable path of one of the transistors, said transistors having control electrodes operated by the timer circuit, means directly interconnecting the common supply of voltage and the common electrodes of the light emitting components for conducting the same driving current through each of the series circuits, said light emitting components being diodes interconnected in a common electrode configuration to form a numeric type of display, and said common voltage supply including a source of AC voltage to which the diodes are directly connected in parallel and rectifying means connecting the AC source to the timer circuit.

4. In combination with a timer circuit having a plurality of transistors interconnected in a common electrode configuration for drive from a common supply of voltage, a display device comprising a plurality of light emitting components having common electrodes interconnected in parallel, a plurality of series circuits respectively formed by at least one of the light emitting components connected in series with the controllable path of one of the transistors, said transistors having control electrodes operated by the timer circuit, and means directly interconnecting the common supply of voltage and the common electrodes of the light emitting components for conducting the same driving current through each of the series circuits said common voltage supply including an AC source and rectifying means connecting the source directly to the light emitting components in parallel.

5. The combination of claim 1 wherein said transistors are of the P-channel type connected in a common source configuration.

6. The combination of claim 5 wherein said light emitting components are diodes interconnected in a common cathode configuration.

7. The combination of claim 6 wherein the driving current has a periodically varying characteristic.

8. The combination of claim 7 wherein the common voltage has a positive polarity terminal connected to the common electrodes of the transistors.

9. The combination of claim 3 wherein said light emitting components are diodes interconnected in a common cathode configuration.

10. The combination of claim 3 wherein the driving current has a periodically varying characteristic.

11. The combination of claim 1 wherein said display device includes numeric image forming segments respectively formed by said light emitting components.

12. The combination of claim 1 wherein said transistors are of the P-channel type connected in a common drain configuration and receiving a negative driving current from the common voltage supply, the light emitting components being diodes interconnected in a common anode configuration.

13. The combination of claim 1 wherein said transistors are of the N-channel type connected in a common source configuration and receiving a negative driving current, the light emitting components being diodes interconnected in a common anode configuration.

14. The combination of claim 1 wherein said transistors are of the N-channel type connected in a common drain configuration and receiving a positive driving current, the light emitting components being diodes interconnected in a common cathode configuration.

* * * * *